Figure 1:
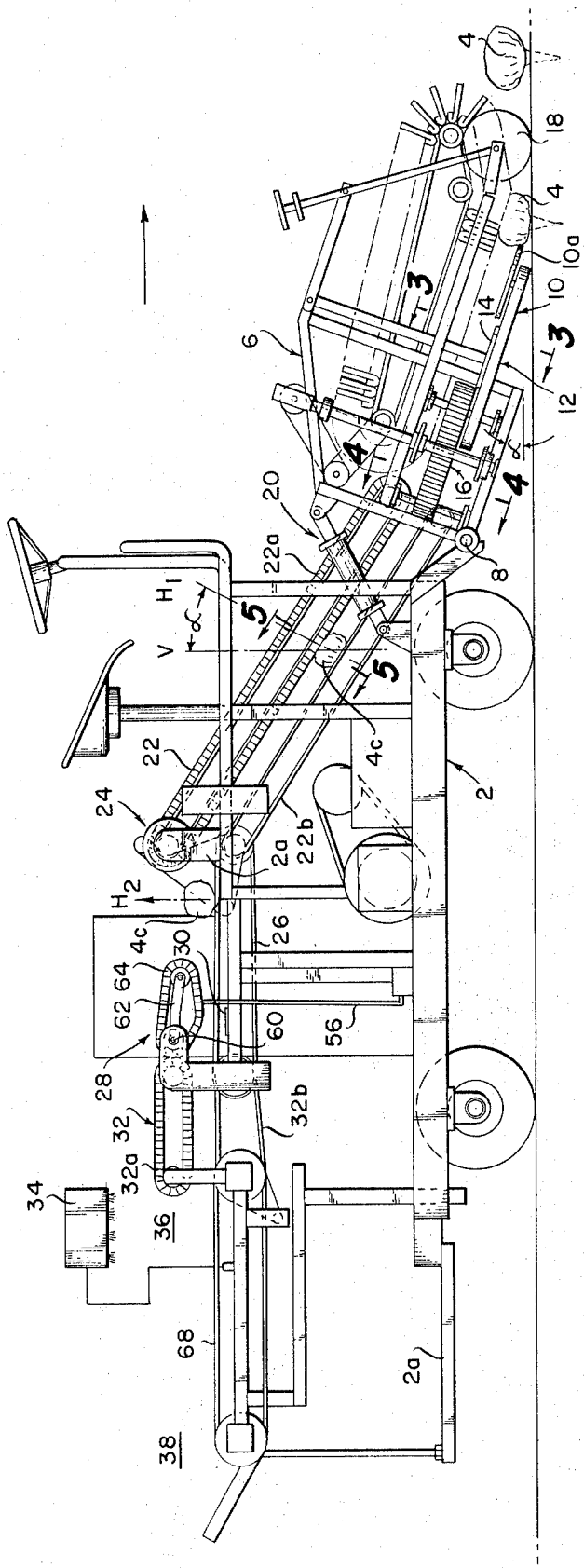

United States Patent [19]
Shepardson et al.

[11] 3,821,987
[45] July 2, 1974

[54] LETTUCE HARVESTING APPARATUS

[75] Inventors: Edwin S. Shepardson, Ithaca; John G. Pollock, Trumansburg, both of N.Y.

[73] Assignee: Cornell Research Foundation, Inc., Ithaca, N.Y.

[22] Filed: Dec. 4, 1972

[21] Appl. No.: 312,130

[52] U.S. Cl............ 171/61, 171/38, 56/327 R, 56/DIG. 15
[51] Int. Cl............................................. A01d 23/04
[58] Field of Search............ 171/61, 62, 36, 37, 38; 56/327 R, DIG. 15

[56] References Cited
UNITED STATES PATENTS

| | | | |
|---|---|---|---|
| 2,422,524 | 6/1947 | Braun | 171/38 |
| 3,194,318 | 7/1965 | Boyer | 56/DIG. 15 |
| 3,380,237 | 4/1968 | Garrett | 56/DIG. 15 |
| 3,497,013 | 2/1970 | Baker | 171/61 |
| 3,503,196 | 3/1970 | Jarrett | 56/327 R |
| 3,589,117 | 6/1971 | Wadsworth | 171/61 |
| 3,690,049 | 9/1972 | Roberson | 171/61 |
| 3,739,854 | 6/1973 | Janssen | 171/61 |

*Primary Examiner*—Antonio F. Guida
*Attorney, Agent, or Firm*—Lawrence E. Laubscher

[57] ABSTRACT

Apparatus for removing loose and/or excess leaves from the head of a leafy edible plant, including conveyor means for conveying the head—after the stump has been removed therefrom—with the residual stump portion arranged at the bottom of the head and with the sides of the head unencumbered, whereby the outermost excess leaves fall by gravity from the head during transport from a first position to a second position. In one embodiment, the head is supported solely between the parallel vertically-spaced adjacent runs of upper and lower endless conveyor means, the horizontal run being less than the diameter of the head, whereby the removal of the excess leaves is greatly facilitated with the aid of gravity. The second position may be higher than the first position, in which event the adjacent parallel runs of the upper and lower conveyors are inclined to the horizontal, thereby further assisting in leaf removal. In a second embodiment, the head is supported by generally horizontal conveyor means that include a pair of parallel spaced adjacent longitudinal runs between which are arranged selectively operable cutter means for trimming the residual stump portion of a head and thereby effect removal of excess leaves therefrom.

13 Claims, 8 Drawing Figures

Fig. 2

Fig. 8

Fig. 3
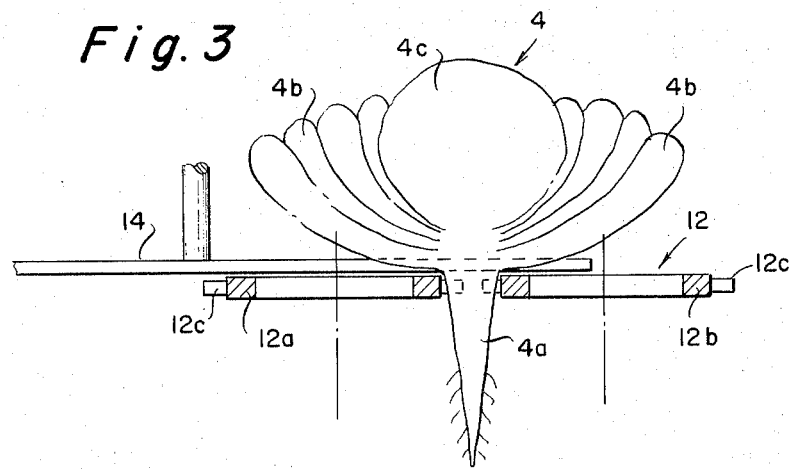
Fig. 4
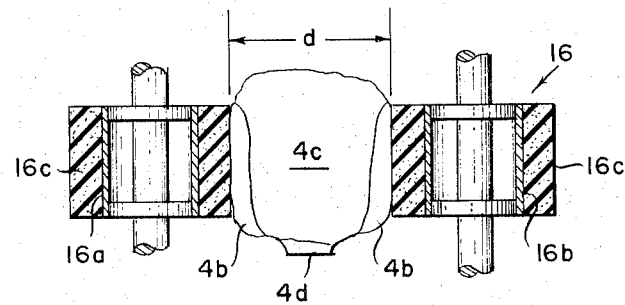
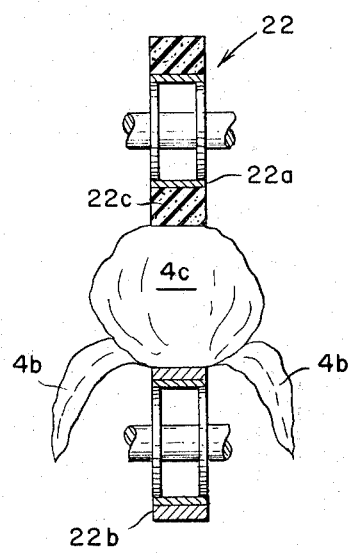
Fig. 5

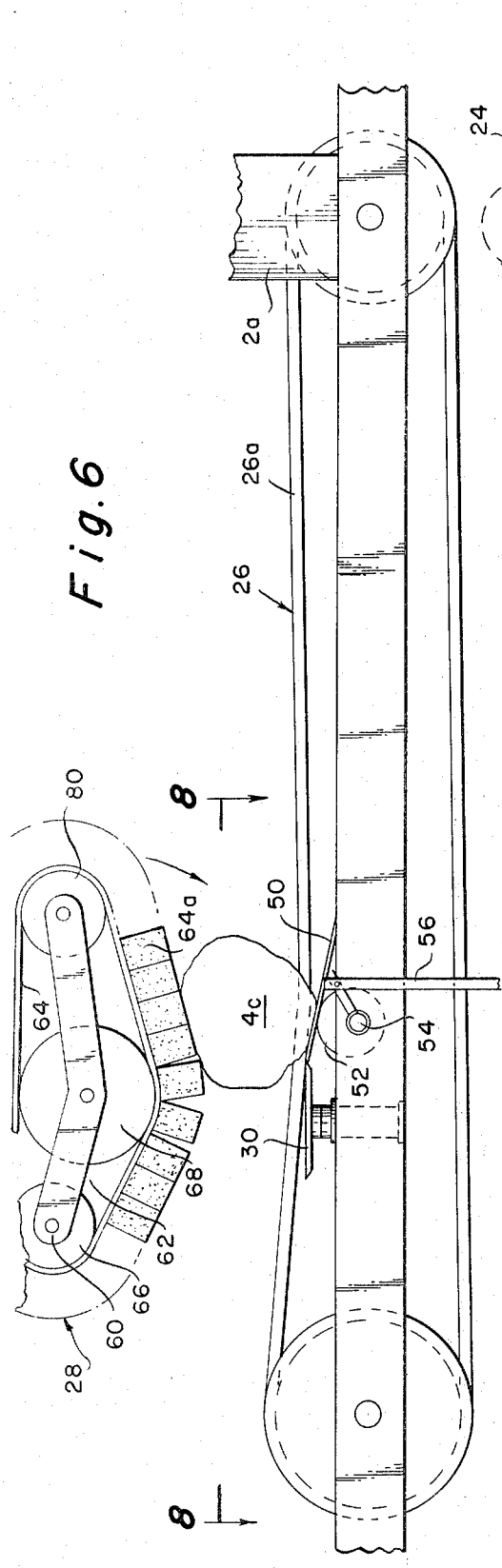
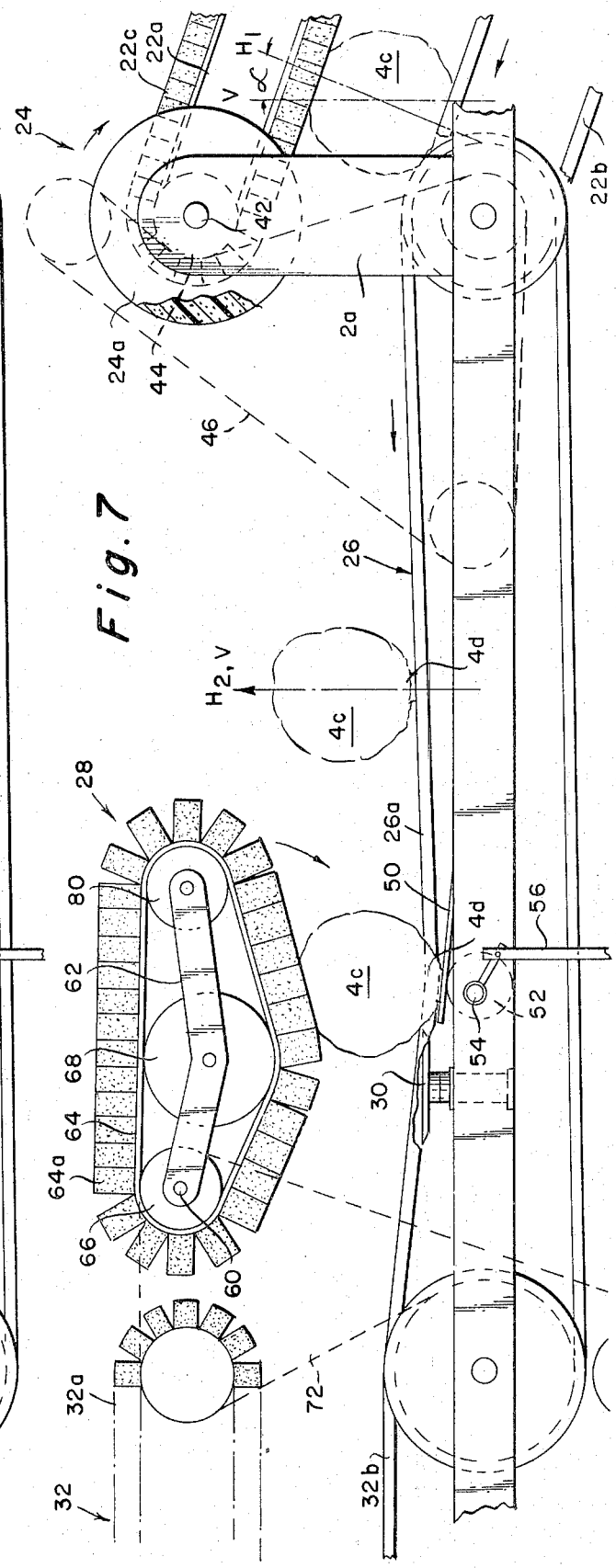

3,821,987

LETTUCE HARVESTING APPARATUS

As evidenced by the U.S. Pats. to Baker, No. 3,497,013, Barnes et al., No. 3,300,954 and Garrett, No. 3,380,237, various types of machines have been proposed in the patented prior art for harvesting leafy crops such as lettuce and cabbage. It is also known in the art to make use of a cooperating pair of endless belts for harvesting leafy crops such as celery and spinach, as evidenced by the U.S. Pats. to Weid et al., No. 2,585,416, Lust, No. 2,833,357, Krier et al., No. 2,855,058 and Holm, No. 3,460,326. These basic harvesting machines possess certain inherent drawbacks that restrict their operating speed and efficiency. One major problem resides in the disposal of the relatively large number of loose leaves that are produced during the harvesting of leafy plants. Quite often these loose leaves are produced in such voluminous quantities as to clog or jam the various components of the harvesting apparatus, thereby materially restricting the speed of operation of the machine. Another drawback of the known harvesting machines is their inability to consistently produce heads of a relatively uniform size. More particularly, on the one hand the known machines are incapable of distinguishing and disposing of underdeveloped heads having a size less than predetermined dimensions, and on the other hand, no means are provided for removing excess leaves from heads to reduce leaf number within desired limits. The present invention was developed to provide an improved harvesting apparatus that avoids the above and other drawbacks of the known machines, is of simple, durable and relatively inexpensive construction, and is operable efficiently at a relatively high harvesting speed.

Accordingly, a primary object of the present invention is to provide a harvesting apparatus including conveyor means for transporting the head of a leafy plant, such as lettuce or cabbage, in such a manner that the sides of the head are unencumbered when the head is oriented with its residual stump portion at the bottom, whereby the loose leaves are permitted to fall by gravity from the head. In one embodiment, the generally vertically oriented head is maintained on a relatively narrow lower support having a width dimension that is less than the average diameter of the heads, whereby the loose leaves readily fall from the head onto the ground. In one embodiment, the lower support comprises the upper run of a narrow endless belt contained in a vertical plane, the head being maintained on the lower support by an upper endless belt contained in the same vertical plane and including a lower run parallel and spaced from the upper run of the lower belt. In applications where it is desired to elevate the heads from a lower first position to an upper second position, the adjacent parallel spaced runs of the endless belts are inclined upwardly, whereby the upward travel of the heads further assists in the removal of the loose leaves.

A more specific object of the present invention is to provide means for removing excess leaves from a head during transport from a first position to a second position. To this end, use is made of generally horizontal conveyor means including a pair of parallel spaced coplanar horizontal runs between which are arranged normally deactivated cutting means. Head orientation means are provided for accurately positioning each head on the horizontal conveyor means with a vertical orientation in which the residual stump portion of the head is at the bottom of the head and is contained between said spaced horizontal runs. Selectively operable means are provided for activating the cutting means upon the presence of a head to trim the lower extremity of the stump portion therefrom and thereby define additional loose excess leaves that fall by gravity from the head upon the ground.

In accordance with a further object of the invention, spray means are provided for spraying a cleaning fluid on the residual stump portion of the head to remove dirt that is collected on the head during its removal from the ground. In order to permit the use of downwardly directed spray means, second orientation means are provided for rotating each head—subsequent to passage through the excess leaf trimming station—through an angle of 180°, whereby the residual stump portion of the head is directed upwardly for cleaning.

A further object of the invention is to provide supply conveyor means that automatically separate and discharge from the apparatus undeveloped heads of a less than acceptable size. To this end, the supply conveyor means comprise a pair of endless conveyors contained in a common generally horizontal plane, said conveyors having parallel longitudinally extending adjacent runs that are spaced a distance equal to the minimum acceptable head diameter, whereby undersized heads will automatically drop by gravity from the supply conveyor means prior to entry on the leaf-separating conveyor means.

Other objects and advantages of the invention will become apparent from a study of the following specification when viewed in the light of the accompanying drawing, in which:

Figures 2, 8:
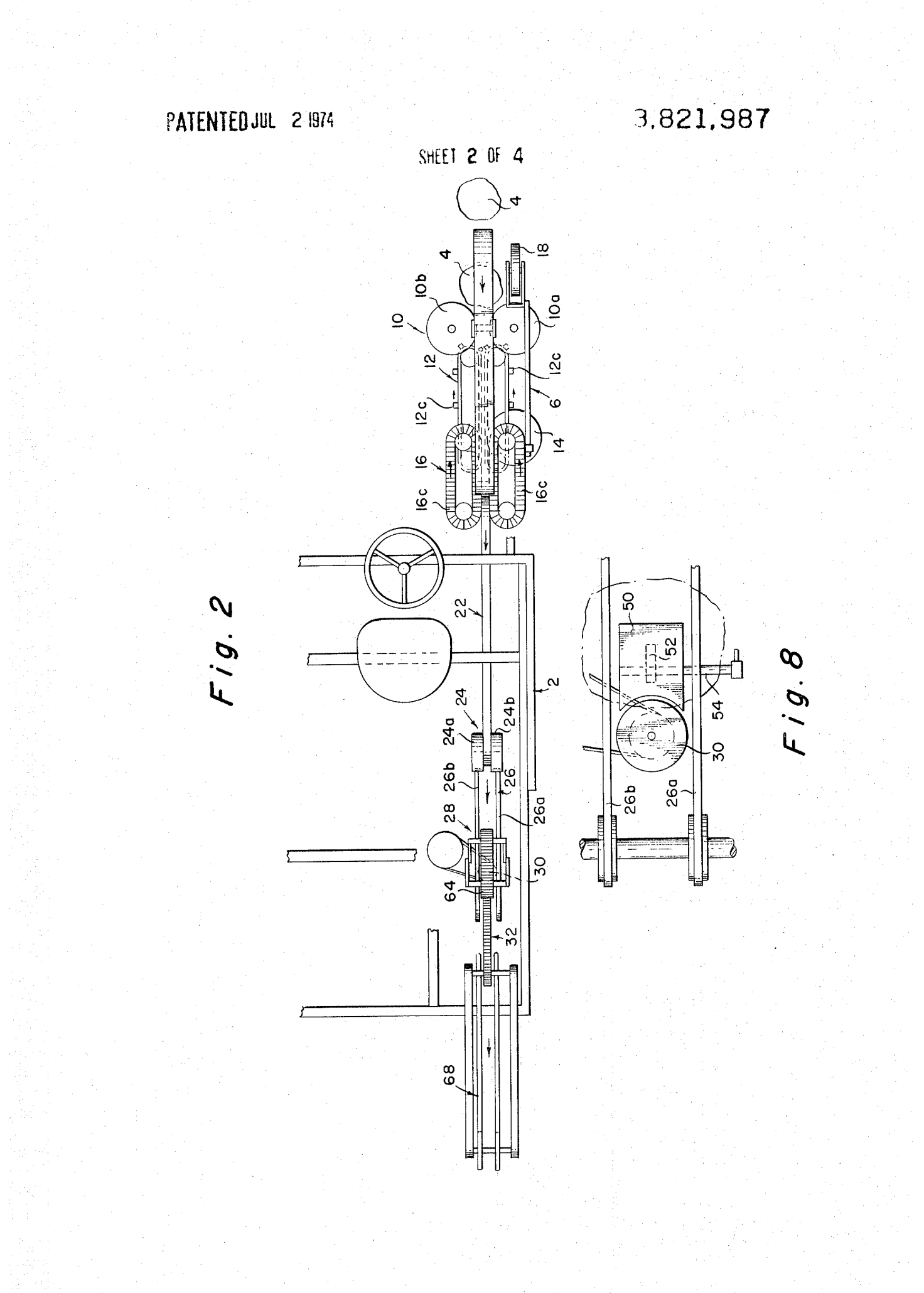

FIGS. 1 and 2 are side elevation and detailed top plan views, respectively, of the lettuce harvesting apparatus of the present invention;

FIGS. 3, 4 and 5 are sectional views taken along lines 3—3, 4—4 and 5—5, respectively, of FIG. 1;

FIGS. 6 and 7 are detailed elevational views of the cutting means of FIG. 1 when in the deactivated and activated conditions, respectively; and FIG. 8 is a sectional view taken along line 8—8 of FIG. 6.

Referring first more particularly to FIGS. 1 and 2, the lettuce harvesting apparatus of the present invention comprises a wheeled frame 2 adapted to transport along a row of lettuce plants 4 which are growing in the soil and are ready for harvest. The apparatus includes at its forward end a harvesting head 6 that is pivotally connected with the forward end of the frame 2 by pivot means 8, said harvesting head including angularly arranged disk means 10 that elevate the lower leaves of a lettuce plant, plant elevating means 12 that grip the stump portion of the plant and pull the plant (with the head and stump portions intact) from the soil, stump severing means 14 that sever the stump portion from the head, and supply conveyor means 16 that transport the severed head rearwardly to the front end of the frame 2. Forward sensing wheel 18 engages the ground to control the angular position of said harvesting head by control valve means (not shown) and the hydraulic piston motor 20.

Arranged at the forward end of the frame 2 are leaf removal conveyor means 22 that transport the severed heads supplied by the supply conveyor means 16 from a lower first position to a higher second position displaced longitudinally of the frame. First orientation means 24 cause the heads at said second position to be accurately oriented vertically with the residual stump portion arranged at the bottom of the head, and horizontal conveyor means 26 transport the heads through a normally deactivated residual stump trimming station 28 including a rotary cutting means 30. The cutting means 30 is selectively operable upon the presence of a head to trim the lowermost extremity of the residual stump portion to remove excess leaves from the head. Second orientation means 32 rotate the rearwardly conveyed heads through an angle of 180°, whereby the residual stump portions are directed upwardly for cleaning by the downwardly directed liquid spray of spray means 34 at washing station 36. A worker standing on the rear platform portion 2a of the frame at loading station 38 then loads the cleaned properly dimensioned heads into suitable containers (not shown). In the alternative, automatic loading means (not shown) may be provided for automatically loading the cleaned heads into the containers.

Referring more particularly now to FIG. 3, the plant elevating conveyor means 12 include a pair of endless chains 12a, 12b contained in a common plane that is inclined slightly to the horizontal by an acute angle $\alpha$ (for example, about 20°) as shown in FIG. 1. The chains are provided on their outer peripheries with spaced projections 12c, said chains having spaced parallel longitudinally extending runs for gripping the stump portion 4a of the lettuce plant after the excess leaves 4b have been elevated by the leaf disks 10a and 10b. The stump portion is gripped between the projections 12c of the opposed runs, whereupon the plant is transported rearwardly into the path of the rotary knife means 14 which severs the stump portion 4a from the lettuce head 4c. The severed head is then engaged on each side by the supply conveyor means 16 which include a pair of endless belts 16a, 16b (FIG. 4) also contained in a plane inclined to the horizontal by the acute angle $\alpha$, said belts being provided on their outer peripheries with resilient blocks 16c formed of foam rubber or the like.

The supply belt means 16 transport the heads rearwardly toward the front end of frame 2, each of the heads being oriented with its vertical axis inclined to the vertical by the acute angle $\alpha$ and with the residual stump portion 4d arranged generally at the bottom of the head. The heads are introduced successively into the forward end of the elevating conveyor means 22 which includes upper and lower endless belts 22a and 22b, respectively, that are contained in a common vertical plane (FIG. 5). The upper belt 22a with a plurality of resilient blocks 22c formed of foam rubber or like material. In accordance with a characterizing feature of the present invention, the lower elevating belt 22b is relatively narrow, the width of said belt being less than the diameter of the heads supplied by the supply conveyor means 16. Since the heads are supported solely at their top and bottom portions by the adjacent parallel spaced and inclined runs of the upper and lower endless belts 22a and 22b, respectively, during elevation from the lower supply position to the upper discharge position, the loose excess leaves 4b—which were severed by the rotary knife means 14—are free to fall by gravity from the heads onto the ground. During elevation by the leaf removing conveyor means 22, the vertical axis $H_1$ of each head is maintained at the angle $\alpha$ to the vertical line V as shown in FIGS. 1 and 7.

Rotatably supported by the pedestal portion 2a of frame 2 is a shaft 42 upon which is mounted the pulley support 44 for the upper end of upper run 22a. Mounted on the shaft are a pair of spaced resilient orientation rollers 24a and 24b that are driven by the sprocket and chain drive means 46 in the clockwise direction at a slightly greater peripheral speed than that of the leaf removing conveyors 22a and 22b, thereby effecting accurate rotation of the head through the angle $\alpha$ to the orientation at which the vertical axis $H_2$ of the head is coincident with the vertical line V. The head is then supported with this vertical orientation during transport by the spaced upper runs 26a, 26b of horizontal belt means 26 to the residual stump trimming station 28.

Referring now more particularly to FIGS. 6–8, the trimming station includes a rotatably driven cutting disk 30 that is arranged for rotation about a vertical axis arranged between the horizontal runs 26a, 26b, the diameter of the tool being less than the spacing distance between the runs as shown in FIG. 8. Angularly arranged in front of the disk 30 is a guard plate 50 that is pivotally connected at its forward end with the frame for movement between first (FIG. 6) and second (FIG. 7) positions in which the cutting tool is concealed and exposed, respectively. Movement of the guard plate between these first and second positions is controlled by the cam 52 that is connected with shaft 54 for rotation by the foot pedal operated link 56.

Pivotally connected with the frame 2 above the cutting disk 30 for pivotal movement about the shaft 60 is a pressure carriage 62 that includes an upper endless belt 64 mounted on the pulleys 66, 68, 70, said belt being driven by sprocket chain 72 at substantially the same speed as the horizontal belt means 26. The outer periphery of the endless belt 64 is covered with resilient blocks 64a formed of foam rubber or the like. The weight of the pressure carriage 62 is such as to bias each head of lettuce downwardly into engagement with the guard plate 50 during transport through the residual stump trimming station 28. When the guard plate 50 is in the FIG. 6 position concealing rotary knife disk 30, no trimming action takes place, and the head—which contains the desired number of leaves—slides over the upper face of the knife disk and continues toward the washing station. In the case of a head with too many leaves, however, link 56 is displaced downwardly to rotate cam 52 in the clockwise direction, whereupon guard plate 50 is pivoted downwardly to the FIG. 7 position to expose the cutting edge of rotary knife 30. The lowermost extremity of the residual stump portion 4d is then trimmed by the cutting disk to sever a further number of excess leaves from the head, which excess leaves are free to fall by gravity upon the ground.

The head is then transported through a second orienting station 32 including upper and lower endless belts 32a and 32b, respectively, the upper belt being driven at a predetermined faster speed than the lower belt to cause the heads to be rotated through an angle of 180°, whereupon the residual stump portion of each head is directed upwardly, and the cut excess leaves fall by gravity on the ground. The heads are then conveyed by conveyor means 68 through the downward spray of the spray means 34 at washing station 36, thereby washing from the heads the residual dirt that was initially deposited thereon by the leaf elevating disks 10. The washed clean heads of generally uniform number of leaves are then packed—either manually or automatically—into suitable receptacles at the loading station 38. It is apparent that opportunities for visual inspection of the heads are presented at trimming station 28 and loading station 38.

Owing to the provision of resilient blocks on the endless supply conveyor means 16, the upper retaining conveyor 22a, the orientation rolls 24a and 24b, and the pressure carriage conveyor 64 and the second orientation conveyor 32a, the heads are gently handled without damage during transport through the lettuce harvesting apparatus. Field studies have proved that at least 90° percent of the severed leaves are removed from the heads. While the apparatus has specific utility in connection with the harvesting of lettuce and cabbage, it is apparent that it could be used as well in connection with other crops, such as cauliflower and other vegetables. While the spray means 34 have been illustrated as being downwardly directed, it is apparent that they could be upwardly directed and arranged generally below horizontal conveyor means 68 whereby the necessity for the second orientation means 32 is obviated.

While in accordance with the provisions of the Patent Statutes the preferred forms and embodiments of the invention have been illustrated and described, it will be apparent to those skilled in the art that various changes and modifications may be made without deviating from the inventive concepts.

What is claimed is:

1. Apparatus for treating the head of a leafy vegetable that has been severed from its stump to define on said head a plurality of excess leaves and a residual stump portion, comprising
   a. a narrow support (22b) having a width dimension that is less than the diameter of said head;
   b. means for retaining said head on said support in a position in which the head is generally vertically arranged and the stump portion of the head is seated on the conveyor, said retaining means being in engagement solely with the top portion of the head and with the side portions of the head completely unencumbered; and
   c. means for displacing said support to transport said head from a first position to a second position, whereby the excess leaves fall by gravity from the head.

2. Apparatus as defined in claim 1, wherein said support comprises the upper run of a first endless belt (22) contained in a vertical plane.

3. Apparatus as defined in claim 2, wherein said retaining means comprises the lower run of a second endless belt arranged above and coplanar with said first endless belt, said upper and lower runs being parallel and spaced.

4. Apparatus as defined in claim 3, wherein said second position has a higher elevation than said first position.

5. Apparatus as defined in claim 4, and further including
   means at said first position for introducing a succession of said heads between said first and second endless belts, each of said heads being initially oriented with its vertical axis inclined at a slight acute angle to a vertical line contained in said vertical plane; and
   means at said second position for rotating said head to a second orientation in which its vertical axis is coincident with said vertical line, whereby said residual stump portion is at the bottom of the head.

6. Apparatus as defined in claim 5, and further including generally horizontal conveyor means including an upper run for transporting each of said vertically oriented heads from said second position to a third position, and residual stump cutting means intermediate said second and third positions for cutting the lower extremity of said residual stump portion to effect further removal of additional excess leaves from said head, whereby said heads have a generally acceptable size and leaf number.

7. Apparatus as defined in claim 6, and further including spray means adjacent said horizontal conveyor means for spraying cleaning fluid on said head.

8. Apparatus as defined in claim 7, wherein said spray means are downwardly directed and are arranged above said horizontal conveyor means, and further including means for rotating each of said heads to a position in which the residual stump portion is at the top of said head.

9. Apparatus as defined in claim 5, and further including a wheeled frame adapted for transport longitudinally of a row of said vegetables, said first and second endless belts extending longitudinally of said frame.

10. Apparatus as defined in claim 9, wherein said head introducing means comprises harvesting head means connected with the front of said frame for removing successive vegetable plants from said row, and severing means for severing the stump portions from said plants.

11. Apparatus as defined in claim 3, wherein the distance between the lower run of said second endless belt and the upper run of said first endless belt equals the minimum acceptable head diameter, whereby undeveloped heads of less than acceptable size are discharged by gravity from the space between said endless belts.

12. Apparatus for removing from the head of a leafy vegetable the excess leaves that are defined when the stump is severed from the head, which comprises
   lower support means for supporting said head with an orientation in which the residual stump portion is relatively vertical and with the peripheral side portions of the head unencumbered;
   means for conveying said lower support means from a first position to a second position, whereby the excess leaves fall by gravity from the head;
   horizontal conveyor means for receivng a head from said second position, said horizontal conveyor means including a pair of endless belts contained in parallel spaced vertical planes, the upper runs of said endless belts being parallel, spaced and normally contained in a common generally horizontal plane, the spacing distance between said upper runs being less than the minimum permissible diameter of said head, whereby said upper runs are operable to support a head when the head is oriented with its vertical axis arranged vertically and with the residual stump portion at the bottom of the head;
   normally deactivated cutting means for cutting off the lower extremity of said residual stump portion during transport of said head by said upper runs of said horizontal conveyor means; and selectively operable means for activating said cutting means, thereby to produce additional excess leaves that fall by gravity from said head.

13. Apparatus as defined in claim 12, wherein said cutting means is horizontal and arranged between said vertical planes, slightly below said horizontal plane and between the ends of said upper runs; and further including an inclined guard member arranged forwardly of said cutting member relative to said upper runs, said guard member being movable by said activating means between first and second positions concealing and exposing said cutting means, respectively; and means adjacent said cutting means for biasing each head and the corresponding intermediate portions of the upper runs downwardly below said horizontal plane to cause the residual stump portion of said head to slidably engage said guard member, whereby displacement of said guard member from said first position to said second position by said activating means effects cutting of the lowermost extremity of said residual stump portion.

* * * * *